United States Patent [19]

Ricobene et al.

[11] E Re. 29,415

[45] Reissued Sept. 27, 1977

[54] FOOD CONTAINER ASSEMBLY

[76] Inventors: Sam Ricobene, 250 W. 26th St.; Lyman D. Dunn, 325 W. 25th Pl., both of Chicago, Ill. 60616

[21] Appl. No.: 724,499

[22] Filed: Sept. 20, 1976

Related U.S. Patent Documents

Reissue of:

[64] Patent No.: 3,908,852
Issued: Sept. 30, 1975
Appl. No.: 287,651
Filed: Sept. 11, 1972

[51] Int. Cl.[2] ..... A45C 11/20; B65D 1/24; B65D 21/02

[52] U.S. Cl. ..... 206/550; 217/25.5; 206/545; 220/4 D; 220/4 E; 220/23.6; 229/2.5 R

[58] Field of Search ..... 206/541, 545, 550; 229/2.5; 220/4 B, 4 E, 4 C, 4 D, 9 F, 23.6; 217/25.5, 26, 26.5

[56] References Cited

U.S. PATENT DOCUMENTS

| | | | |
|---|---|---|---|
| 1,886,109 | 11/1932 | Lenfant | 220/4 D |
| 2,514,573 | 7/1950 | Harrison | 220/4 D |
| 2,999,611 | 9/1961 | Paulson | 220/4 E |
| 3,191,791 | 7/1965 | Jackson | 217/25.5 |
| 3,208,589 | 9/1965 | Rayburn | 217/26 |
| 3,251,460 | 5/1966 | Edmonds | 206/46 FC |
| 3,484,015 | 12/1969 | Rowan | 206/4 |
| 3,552,548 | 1/1971 | Wallestad | 220/4 D |

*Primary Examiner*—George E. Lowrance
*Attorney, Agent, or Firm*—Mason, Kolehmainen, Rathburn & Wyss

[57] ABSTRACT

A nestable stackable food container for the temporary storage of items, particularly food items, characterized by the provision of interengageable tray-like members having a channeled interior bottom surface and vent means leading outwardly of the tray members, with the tray members including a bottom, a top, which is nestably associated with the bottom, for containing a single food item; and a plurality of intermediate tray members which may be stacked in vertical tandem for containing a plurality of food pieces in a unitary stacked carton arrangement.

4 Claims, 8 Drawing Figures

FIG. 1
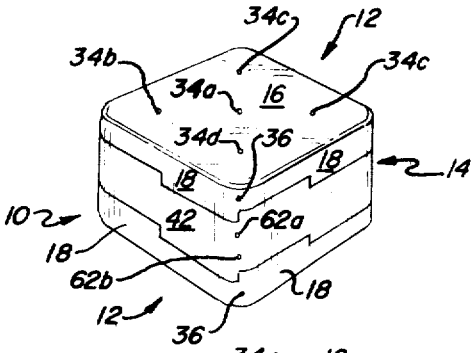
FIG. 2
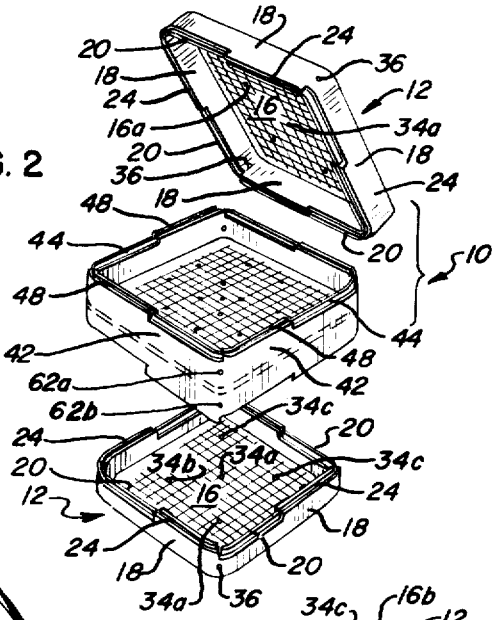
FIG. 3
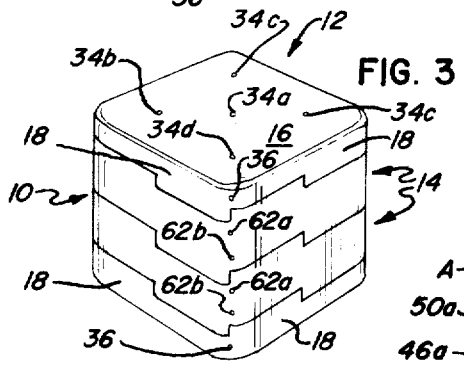
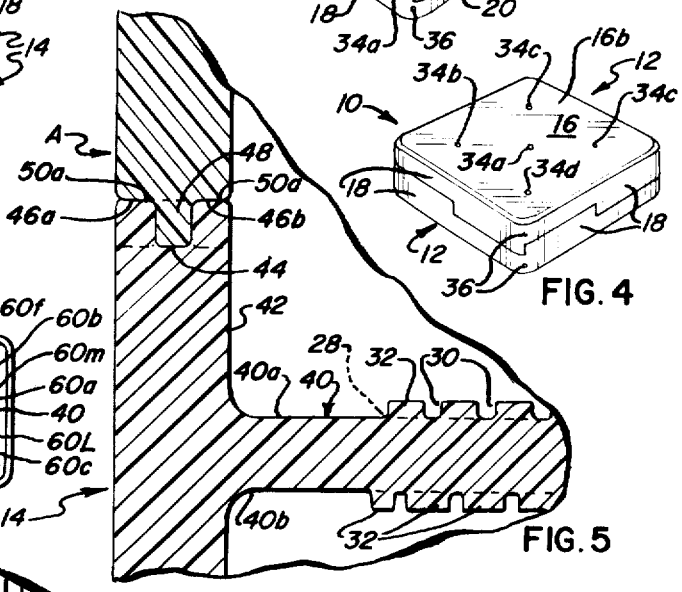
FIG. 5
FIG. 4
FIG. 7
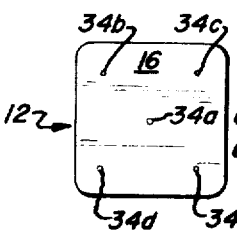
FIG. 8
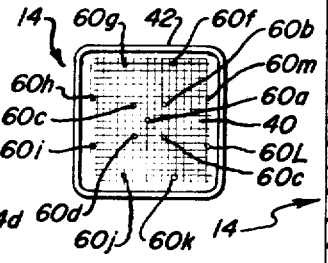
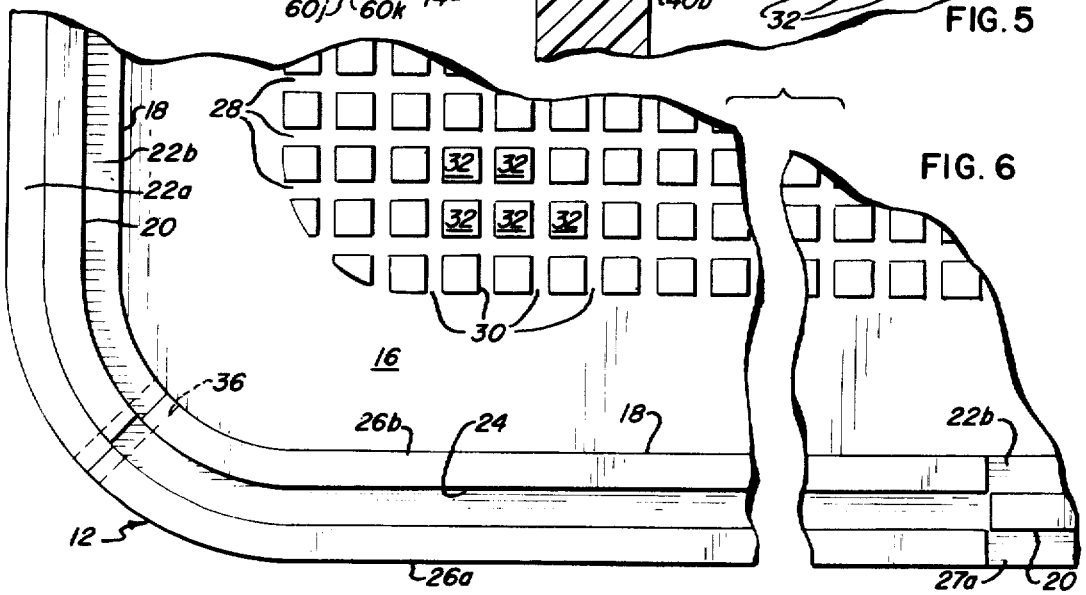
FIG. 6

FOOD CONTAINER ASSEMBLY

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to food containers and more particularly to a nestable tray-like container for the storage of food stuffs.

2. Brief Description of the Prior Art

Typically food stuffs, such as pizzas, are stored in cardboard cartons or the like incident to delivery and use. Recently, expanded foam plastic food containers have come into use. These containers have featured a lid and a base member for holding an individual pizza. Other food stuffs, such as chicken products or the like, generally come in cardboard boxes which have poor insulating qualities and which tend to retain the moisture therein so as to cause the food product to become soggy and lose its crispness over a period of time.

It is the object of this invention to meet the need and desire in the packaging art to provide a container arrangement which may adequately maintain a quantity of cold or hot food over a period of time in a "fresh" condition. It is further the object of this invention to provide a container arrangement which may be used for packaging a single product or multiplicity of products in variable tandem array wherein only two different members are provided, with the container top and bottom being identical and nestably engageable with each other; and wherein an additional intermediate member is provided which is universally interengageable with either the container top or the bottom or a like intermediate member to increase the capacity of the container unit.

SUMMARY OF THE INVENTION

This invention is directed, in brief, to the provision of an improved vertically nestable container arrangement particularly suited for food products or the like.

The best mode currently contemplated for carrying out the invention includes at least a pair of first tray-like members which are intended to comprise both the bottom and top of a container. Each first member has a base which is scored to provide channels therein and side walls projecting upwardly from one face of the base. Each of the side walls terminates in offset tongue and groove portions so that two such first members can be assembled together to form a container with a single interior cavity. Second or intermediate members may also be provided, with each intermediate member including a medial panel which is scored on both sides. The second member has side walls which project beyond both faces of the medial panel equidistant therefrom with each of the side walls having identical offset tongue and groove portions to those of the first members so that the second intermediate member may be positioned between a pair of the first members, in any rotational orientation relative thereto, and mate therewith, so as to increase the number of interior cavities for holding an article. Preferably a plurality of vent holes are provided in each of the first and second members for permitting the escape of moisture laden air or the like.

BRIEF DESCRIPTION OF THE DRAWINGS

FIG. 1 is a perspective view of the container arrangement of this invention showing a pair of first members and a single intermediate member so that the container is provided with two interior cavities;

FIG. 2 is an exploded view of the container arrangement shown in FIG. 1;

FIG. 3 is a perspective view of the container arrangement with an additional intermediate member positioned between the top and bottom so as to further increase the capacity of the unit shown therein;

FIG. 4 is a perspective view of the container arrangement of this invention wherein only the top and bottom panels are connected together to provide a container with a single cavity for holding a product therein;

FIG. 5 is a fragmentary enlarged section view showing the interengagement between vertically adjacent container members;

FIG. 6 is a fragmentary enlarged plan view showing the offset relationship of the tongue and groove portions of the side walls of each of the container members;

FIG. 7 is a top plan view of a top or bottom panel unit showing the location of vent holes therein; and FIG. 8 is a top plan view of an intermediate panel unit showing the location of vent holes therein.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

BRIEF DESCRIPTION OF THE PREFERRED EMBODIMENT

The food container assembly 10 of this invention comprises at least a pair of identical end panels 12 as shown in FIG. 4 and also may include a single intermediate panel 14 as shown in FIG. 1 or a plurality of intermediate members 14 as shown in FIG. 3.

Each of the end panels 12 is generally tray-like in configuration and includes a base portion 16 which is a substantially planar structure having an outer face 16a and an inner face 16b. In the illustrated embodiment, members 12 are generally rectangular in configuration and are provided with four outwardly projecting side walls 18. Each side wall is divided, along its longitudinal extent, into a half tongue portion and a half groove portion. Specifically, each side wall 18 has a medially upwardly projecting tongue 20 along half of its longitudinal extent which is flanked by two shoulders 22a and 22b. The other half of each side wall 18 is provided with a relative groove 24 flanked by two upstanding rails 26a and 26b. Generally speaking the base of groove 24 is co-planar with the surface of shoulders of 22a and 22b, and the height of tongue 20 is substantially co-planar with the height of rails 26a and 26b. The tongue 22 is generally of a size and shape to be matingly nestably received within groove 24 in a snug locking arrangement, as illustrated in FIG. 5.

The inner face 16b of each of the end panels 12 is scored in transverse channels 28 and 30 providing a plurality of relatively raised pads 32 upon which the article to be held within the container will be supported. In the preferred embodiment each pad is approximately ½ by ⅛ inch in dimension in that the intersecting channels 28 and 30 are formed in parallel rows a half inch apart.

The end panels 12 are further provided with vent means in the form of apertures, including apertures 34a, b, c, d, and e in the base portion 16 thereof and an aperture 36 in each of the corners of the side walls 18. Those vents 34a through e which are formed in the base members preferably include one aperture 34a which is in the middle of the base, with the other four apertures being located along a mid-point on each of the diagonals between the corner of the base and the middle vent 34a.

Each intermediate tray member 14 comprises a generally planar medial web 40 having opposite faces 40a and 40b. Again, with the configuration of the elements being generally rectangular, the medial webs are provided with four side walls 42 which project an equal distance above and below the medial web 40. The side walls each are divided into one half tongue portions and one half groove portions identical to those described with respect to the side walls of the end panels 12. Each side wall has a tongue 44 along one half of its extent bordered by shoulders 46a and 46b and, is provided with a groove 48 bounded by rails 50a and 50b along the other half of its extent.

The tongue and groove arrangement 44 and 48 in the side walls 42 of the intermediate members 14 is intended to be identical with that tongue and groove arrangement 20 and 24 of the end panels 12 so that the intermediate panels will nestably engage therewith. Thus the illustrations of the structure of tongue and groove 44 and 48 in FIG. 5 is also illustrative of tongue and groove 20 and 24 and the converse is true with respect to FIG. 6.

Each face 40a and 40b of the web 40 is also scored in transverse intersecting channels 28 and 30 to provide a plurality of relatively raised pads 32 which will support an article held on the web 40. Again, preferably the pads 32 are approximately a half inch on a side in that the channels 28 and 30 are formed in parallel rows approximately ½ inch apart.

Vent means are provided for permitting the flow of gas and moisture through the intermediate panels 14. Included in this vent means is a plurality of apertures formed in the web 40, such as the apertures 60a, 60b, 60c, 60d, 60e, 60f, 60g, 60h, 60i, 60j, 60k, 60l, and 60m. It is to be noted that the aperture 60a is formed in the center of web 40 with the apertures 60b, c, d, and e formed closely adjacent thereto in a square rectangular pattern thereabout concentric to the configuration of the web 40. The remaining apertures 60f through 60m are formed close to the side walls 42 and are generally spaced a third of the way in from each corner of the web 40. In addition, vents are formed on each corner of the intermediate panel 14, above and below the medial web 40 in vertical pairs including the pair 62a, 62b as illustrated in FIGS. 1 and 3. It is to be understood that a like pair of vents is provided in each corner of the member 14 with each aperture 62a being relatively below the medial web 40.

The food carton assembly of this invention is extremely well suited for maintaining heated articles of food in a condition of warmth and freshness over comparatively long periods of time. The channeled bottom [surfaces] *surface* of each panel member supports the food article over a series of communicating grooves which act as conduits to permit the circulation [if] *of* air completely about the [good] *food* article. As the air circulates it will tend to collect moisture and the moisture laden air will escape outwardly through the several vents provided in each panel member. Thus there is no opportunity for the air within the container to become super saturated with moisture which would condense in the container and have a deleterious effect on the food held therein.

When the two end panels 12 are assembled together as shown in FIG. 4, a single container interior chamber is formed for holding an item therein. With the addition of each intermediate panel member 14 inserted between the end panels 12 and number of interior chambers [is increased by one. Each of the interior chambers] forms a container sub-unit of the entire assembled unit which in theory may consist of two end panels 12 and an unlimited number of intermediate panels 14.

In the assembly as shown in FIGS. 1 and 3 wherein a plurality of panels 12 and 14 are assembled in vertical tandem, the interior of each container sub-unit is in communication with the interior of the next vertically adjacent container sub-unit so that air may circulate between the containers, as well as outwardly to the exterior of the assembly. This provides a cumulative heating effect while permitting the escape of the moisture laden air from each compartment. It has also been found that the food container assembly of this invention is also well suited for maintaining cold food articles in a state of coolness and freshness over an extended period of time as well.

The complementary offset mating side wall structure provides a means for securely assembling the several portions together with a minimum of initial orientation of the compartments required, in that each side wall of each end member 12 or intermediate member 14 is matingly engageable with any side wall of another member 12 or 14. With respect to the intermediate members 14 this is further true independent of whether face 40a or face 40b is facing upwardly or downwardly as best illustrated in FIG. 2.

The foregoing detailed description has been given for clearness of understanding only, and no unnecessary limitations should be understood therefrom, as some modifications may be obvious to those skilled in the art.

We claim:

1. A container assembly comprising:

a bottom end panel having an inner face defining a support surface, and a plurality of bottom side walls extending upwardly from the inner face, each bottom side wall terminating in an upper edge defining an irregular offset portion, said bottom panel having a plurality of vent ports or apertures for air communication with the exterior;

at least one intermediate panel adapted to fit on top of the bottom end panel and having a generally horizontal web with a top surface defining a support surface, the web of said intermediate panel including a plurality of apertures for permitting the flow of gas and moisture through said intermediate panel, a plurality of intermediate side walls depending from said web and terminating in an offset lower edge complementary to said bottom end panel upper edge and adapted to matingly interengage with said bottom end panel upper edge, and a plurality of upstanding intermediate side walls terminating in an offset upper edge identical with said bottom side wall upper edge; and a top end panel identical to said bottom panel to fit on top of the intermediate panel and having an inner bottom face, and a plurality of side walls depending from the inner face and terminating in a downwardly facing lower edge identical to said depending intermediate side wall lower edge and adapted to matingly interengage with said upstanding intermediate side wall upper edge, each of said intermediate and bottom panels having on its lower surface and said top panel having on its upper surface a plurality of transverse intersecting channels defining a plurality of pads for supporting a food product with said channels forming conduits for air flow from the bottom panel vent ports through the container and exiting from said top panel vent ports to keep the food product crisp.

2. The [carton member] *container assembly* of claim 1 wherein the apertures include vents provided at the intersection of each side wall and in a regular pattern in the panel area.

*3. A container assembly comprising:*

*a bottom panel having a bottom wall with an inner face defining a support surface in the form of a plurality of intersecting channels, said channels in turn defining therebetween a plurality of pads for supporting a food product, a plurality of ports in said bottom wall for air communication of said channels with the exterior of said container for entry of air into said channels, said bottom panel also having upstanding side wall means terminating at an upper edge defining an irregular offset portion, vent ports in said side wall means for emission of vapors to the exterior of said container assembly; a top panel identical to said bottom panel to fit on top of the bottom panel and having an inner bottom face, and a plurality of side walls depending from the inner face and terminating in a downwardly facing lower edge identical to said upstanding side wall of said bottom panel edge and adapted to matingly interengage with said upstanding bottom panel side wall upper edge, a plurality of vents in the top panel side wall for emission of vapors to the exterior of said container assembly said top panel having on its upper surface a plurality of transverse intersecting channels defining a plurality of pads capable of supporting a food product when in use as a bottom panel with said channels forming conduits for air flow from the bottom panel vent ports through the container and exiting from said top panel vent ports and said side wall vent ports to keep the food product crisp.*

*4. The container assembly of claim 3 wherein said bottom and top panels are generally square in configuration with side wall portions meeting at corners and said side wall ports are in the corners.*

* * * * *